United States Patent [19]
Torigai

[11] 3,729,077
[45] Apr. 24, 1973

[54] SPRING CLUTCH

[76] Inventor: Akiyoshi Torigai, 5-26-20 Higashi, Ohi, Tokyo, Japan

[22] Filed: May 13, 1971

[21] Appl. No.: 143,126

[30] Foreign Application Priority Data

May 18, 1970 Japan ........................45/42316

[52] U.S. Cl. ..................192/81 C, 192/22, 192/26, 192/89 R
[51] Int. Cl. ..................................................F16d 11/06
[58] Field of Search..................192/26, 22, 27, 43.1, 192/81 C, 89 R

[56] References Cited

UNITED STATES PATENTS 1,225,309  5/1917  Bower ..........................192/81 R
R25,229  8/1962  Sacchini et al. ..........................192/26
3,277,986  10/1966  Beare ..........................192/26
3,493,088  2/1970  Hoff ..........................192/26

Primary Examiner—Charles J. Myhre
Assistant Examiner—Randall Heald
Attorney—Fitzpatrick et al.

[57] ABSTRACT

A simple and compact spring clutch suitable for use with paper feed means in copying machines and the like and provided with a coiled spring wound around two equally diametered bosses mounted in opposed relationship and for rotation on a common shaft driven from a drive source. The coiled spring is tightened and loosened with respect to the two bosses whereby when the spring is tightened, the two bosses are connected to transmit a drive and when loosened, the two bosses are separated to interrupt the transmission.

5 Claims, 13 Drawing Figures

Patented April 24, 1973
3,729,077
FIG. 7 FIG. 8 FIG. 9
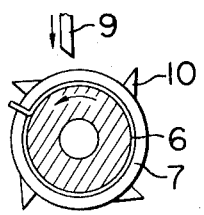
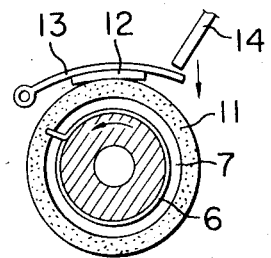
FIG. 10
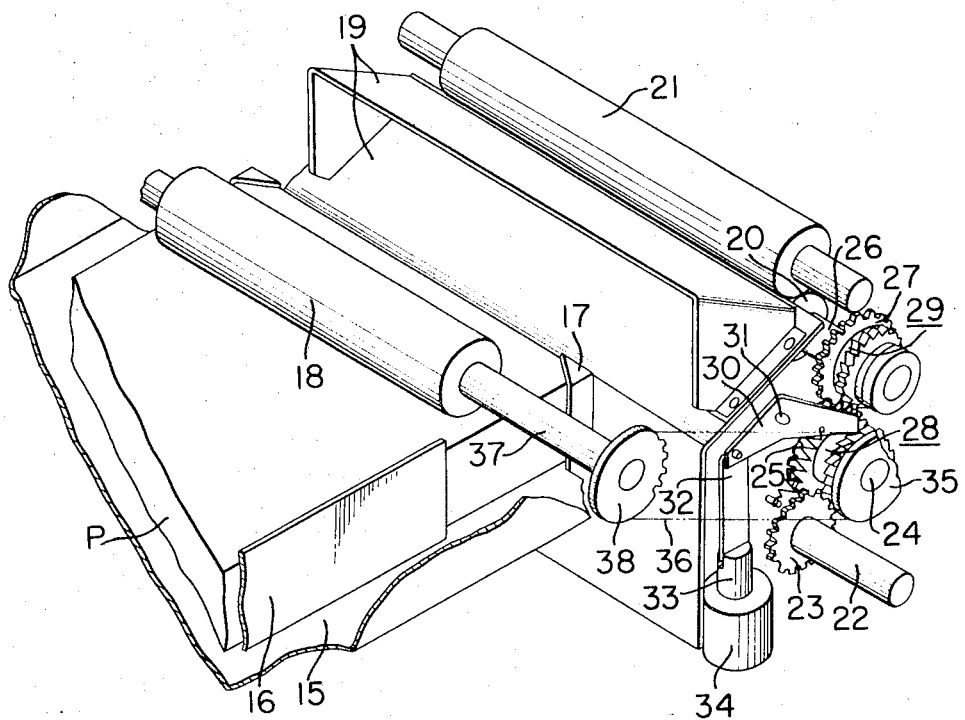

Patented April 24, 1973　3,729,077

SPRING CLUTCH

BACKGROUND OF THE INVENTION

1. Field of the Invention

This invention relates to a clutch as a mechanical element in various machines for intermittently interrupting transmission of rotational movement from a driving shaft to a driven shaft, and particularly to a clutch for intermittently rotating a paper feeder roller, a guide roller and the like in the paper feed mechanism of a copier such as electrophotographic copying machine. More particularly, the invention relates to a spring type clutch utilizing the resiliency of a coiled spring.

2. Description of the Prior Art

The known mechanisms for transmitting a drive between two rotary shafts have used a clutch such as gear clutch, friction clutch, electromagnetic clutch or the like. In any of these conventional clutch mechanisms, a clutch element for transmitting a drive has been displaced to effect a change-over between a clutching position and a declutching position and therefore, a greater space has been required for effecting and maintaining such change-over. This in turn has led to a greater size of the mechanism, and particularly in case of an electromagnetic clutch, to the need for providing a complicated electromagnetic means which is very expensive. Thus, there is still a growing need for compact clutches suitable for use with copiers or like machines which are becoming more and more compact in construction.

SUMMARY OF THE INVENTION

It is therefore a principal object of the present invention to provide a clutch which is compact and simple in construction.

It is another object of the present invention to provide a clutch of simplified construction without using any complicated electrical means.

It is still another object of the present invention to provide a clutch which is durable enough for frequent clutching-declutching operations.

According to the present invention, the boss of a driven gear associated with a driving shaft and the boss of a toothed wheel rotatable with the driven gear are mounted for rotation on a common shaft in opposed relationship with each other and have the same diameter. A coiled spring is wound around the two bosses in a tightening manner with respect to the bosses. When the two bosses are tightened by the coiled spring, they are rotated together so that the rotation of the driving gear is transmitted to the driven gear. When the spring is loosened with respect to the two bosses, the bosses become separate from each other to effect no transmission of rotation therebetween.

A better understanding of the present invention will be had by reading the following detailed description in conjunction with the accompanying drawings.

BRIEF DESCRIPTION OF THE DRAWINGS

FIGS. 6 to 9 are cross-sectional views showing various improved forms of the present invention which eliminate the phenomenon as shown in FIGS. 4 and 5.

FIG. 10 is a perspective view of the inventive spring clutch as applied to a paper feed mechanism in a copying machine or the like.

DESCRIPTION OF THE PREFERRED EMBODIMENTS

Figure 1:
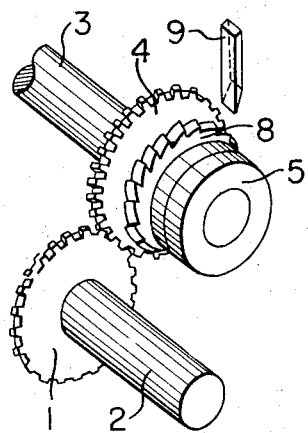
FIG. 1 is a perspective view of a spring clutch constructed according to the present invention.
Figure 2:
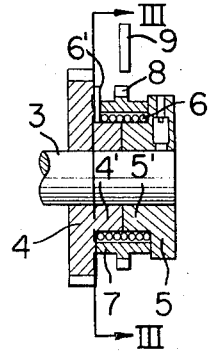
FIG. 2 is a cross-sectional side view of the spring clutch of FIG. 1.
Figure 3:
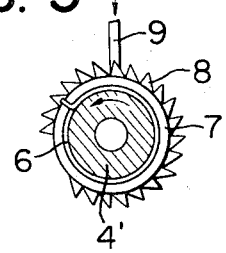
FIG. 3 is a cross-sectional view of the spring clutch taken along lines III—III of FIG. 2.

Referring to FIGS. 1, 2 and 3, a gear 1 is securely mounted on a driving shaft 2. The gear 1 meshes with a gear 4 mounted for rotation on a driven shaft 3 to transmit the rotation of the driving shaft 2 to the gear 4. The gear 4 has a boss 4', and the driven shaft 3 has a wheel 5 securely mounted thereon and having a boss 5' opposed to the boss 4' of the gear 4. The boss 4' of the gear 4 and the boss 5' of the wheel 5 are of the same diameter and closely adjacent to each other, and around these two bosses there is wound a coiled spring 6 having an inner diameter equal to that of the outer diameter of the bosses. A shift ring 7 is loosely fitted around the bosses with the coiled spring 6 interposed between the ring and the bosses, one end of the coiled spring 6 being secured to the shift ring 7. Around the shift ring 7 there is integrally formed a ratchet 8 which is to be engaged by a shift pawl 9 disposed adjacent thereto. There is thus provided a spring clutch of the present invention.

The driving shaft 2 may be the drive shaft of a prime mover or a shaft driven from the prime mover through a suitable transmission. Rotation of the driving shaft 2 is transmitted through gear 1 to gear 4, which is thereby rotated at a reduced speed or at the same speed as the gear 1. If the shift pawl 9 is then imparting no action to the shift ring 7, the coiled spring 6 assumes a tight position with respect to the bosses 4' and 5' and the gear 4 is then rotating in the direction for tightening the coiled spring 6, whereby the two bosses 4' and 5' are rotated together by the tight spring 6. This in turn causes rotation of the wheel 5 and accordingly of the driven shaft 3 integral therewith. When the shift pawl 9 engages the ratchet 8, the shift ring 7 is stopped from rotating. The stoppage of the shift ring 7 and the rotation of the boss 4' of the gear 4 co-act to bring the coiled spring 6 from its tight position into its loose position, thereby allowing the boss 4' to slip and rotate with respect to the coiled spring 6 so that the transmission of the rotation of the gear 4 through the spring 6 to the wheel 5 is interrupted. As the result, the rotation of the driving shaft 2 is not transmitted to the driven shaft 3.

When the spring clutch described above is in non-transmitting position, the boss 4' of the gear 4 slips and rotates with respect to the coiled spring 6 as described previously, and this imparts a considerable load to the spring 6. In order to reduce such an unnecessary load, the coiled spring 6 may be formed of a very thin wire.

However, this would reduce the strength of the coil 6 at the hook end portion 6' thereof where the coiled spring is secured to the shift ring 7, often resulting in breakage of that hook end portion. To avoid this, the coiled spring 6 has heretofore been formed of a sufficiently thick wire to increase the strength thereof. But this is incompatible with the requirement that the coiled spring be desireably formed of a thin wire to reduce the described load and to make the clutch mechanism compact. The researches carried out by the inventor have disclosed the following causes responsible for the foregoing defect of the spring, and according to such findings some improvements have been applied to the spring clutch of FIGS. 1 to 3.

Figure 4:
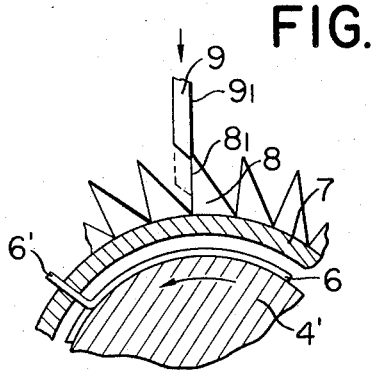
FIGS. 4 and 5 are fragmentary, enlarged cross-sectional views for illustrating a phenomenon occurring when a shift pawl is engaged with a ratchet in the spring clutch of FIG. 3.
Figure 5:
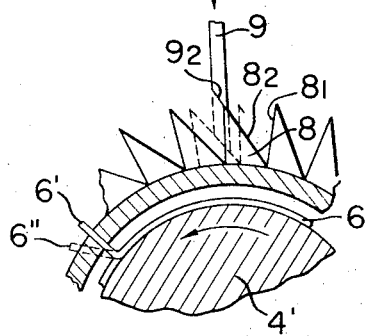

FIGS. 4 and 5 show, on an enlarged scale, details of the spring clutch of FIG. 3 for explaining the interaction between the shift pawl and the ratchet. When the shift pawl 9 enters between adjacent teeth on the ratchet in the relationship as shown in FIG. 4, the surface $9_1$ of the pawl 9 and the surface $8_1$ of the ratchet tooth are engaged with each other to stop the shift ring 7 immediately. At this time, the hook end portion 6' of the coiled spring 6 is subjected to a bending stress resulting from the friction between the spring 6 and the boss 4', whereas such a bending stress is so small that an ideal engagement as shown in FIG. 4 is accomplished between the shift pawl 9 and the ratchet 8. However, when the shift pawl 9 engages the ratchet 8 in the manner as shown in FIG. 5, the sloped surface $9_2$ of the shift pawl 9 contacts the opposed sloped surface $8_2$ of the ratchet 8 so that the pawl 9 forcibly pushes the surface $8_2$ of the ratchet until the pawl strikes the next surface $8_1$ of the ratchet. Since the shift pawl 9 is inserted into the ratchet 8 at a considerably high speed so as to stop the latter, the shift ring 7 is caused to rotate at a higher speed than the boss 4' of the gear 4 by the sloped surface $8_2$ of the ratchet 8, with a result that the hook end portion of the coiled spring 6 is bent into a form as indicated by dotted line 6'' in FIG. 5. The hook end portion of the coiled spring 6 may be repeatedly subjected to such bending stress and broken at last. This is a fatal demerit especially when the spring clutch is used with a paper feed roller which is frequently changed over between rotation and stoppage. Such a problem can also be solved by the present invention, as will be described hereunder.

Figure 6:
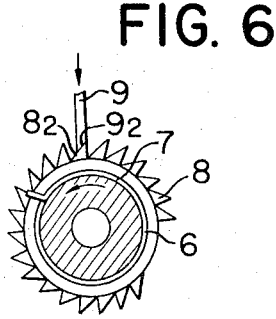

FIGS. 6 to 9 show improved forms of the present invention. In FIG. 6, the ratchet teeth 8 on the shift ring 7 are formed in the opposite direction to those shown in FIGS. 4 and 5. In this embodiment, the direction in which the shift ring 7 is forced to rotate by the engagement between the sloped surface $9_2$ of the shift pawl and the sloped surface $8_2$ of the ratchet is the direction in which the coiled spring is loosened, and this eliminates the problem of the described stress imparted to the hook end portion 6' of the spring 6 to break it. In further forms of the ratchet as shown in FIGS. 7 and 8, a fewer ratchet teeth 10 are formed partly around the shift ring 7 so that the shift pawl 9 may be inserted toward an untoothed peripheral portion of the shift ring and associated with a certain other portion of the mechanism. In a further alternative form as shown in FIG. 9, the shift ring 7 has no tooth formed over its entire peripheral surface 11 and such untoothed surface 11 has a great friction coefficient and is to be engaged by a shoe 12 of great friction coefficient provided with a spring member 13 urged by a pusher 14 disposed behind the spring member 13. Any of these improved embodiments is useful to increase the durability of the spring clutch greatly enough to withstand several tens of thousand operations.

Referring to FIG. 10, there is shown a paper feed mechanism using the above-described spring clutch of the present invention. Reference numeral 15 designates a paper supply table supporting thereon sheets of paper P. The paper supply table 15 is provided with side plates 16 and has separator pawls 17 formed in the forward end thereof as viewed in the direction of paper supply. An uppermost one of the paper sheets P on the supply table 15 is drawn by a paper feed roller 18 rotated in accordance with a paper feed signal and then separated from the next paper sheet by the separator pawls 17, whereafter the paper sheet P is delivered through a guide 19 into the nip between transport rollers 20 and 21 which are then stationary. When the leading edge of the fed paper sheet P contacts the transport rollers 20, 21 and the paper P is further moved to cause an optimum deflection thereof, the rollers 20, 21 begin to rotate and positively nip the paper sheet therebetween so as to transport it into a processing station in the copying machine (not shown). When the paper sheet P reaches the processing station, the paper feed roller 18 is stopped from rotating and so maintained until it is again rotated for another supply of paper sheet in accordance with a paper feed signal.

Description will now be made of the construction and operation of a mechanism for driving the paper feed roller 18 and transport rollers 20 and 21. In FIG. 10, there is seen a prime mover shaft 22 having a gear 23 mounted for rotation thereon. The gear 23 meshes with a gear 25 mounted for rotation on a shaft 24, thereby rotating the latter gear 25. The gear 25 in turn meshes with a gear 27 mounted for rotation on a shaft 26 having one of the transport rollers 20 securely mounted thereon. Thus, rotation of the prime mover shaft 22 causes rotation of the transport roller 20 through the gear train.

Figure 11:
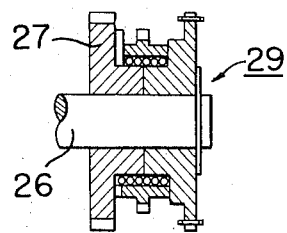
FIG. 11 is a cross-sectional view similar to FIG. 2 showing the spring clutch of FIG. 10.

The parts generally designated by reference numerals 28 and 29 are the spring clutches described with respect to FIG. 1, and these clutches 28 and 29 are hereinafter referred to as a first clutch 28 and a second clutch 29 respectively. The gears 25 and 27 shown in FIG. 10 correspond to the gear 4 of FIG. 1. The first and second clutches 28 and 29 are shown in cross section in FIGS. 11 and 12, respectively. A selector lever 30 is provided so that one end thereof may selectively act on one of the first and second clutches. As shown, the lever 30 is pivotally supported by means of a pin 31 and has the other end thereof connected to one end of a link 32, the other end of which is connected to a plunger 33 actuated by an electromagnetic solenoid 34. As the electromagnetic mechanism, use may be made of an electromagnet having a pole for attracting an armature to actuate the lever 30. Alternatively, a conventionally well-known mechanism using a cam for swinging the lever 30 may be used. In any case, the mechanism can be made compact.

Figure 12:
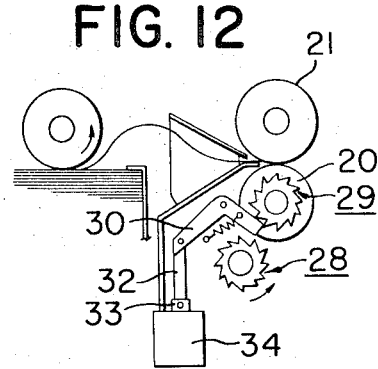
FIGS. 12 and 13 are cross-sectional views for illustrating the manner in which the paper feed mechanism of FIG. 10 is operated.
Figure 13:
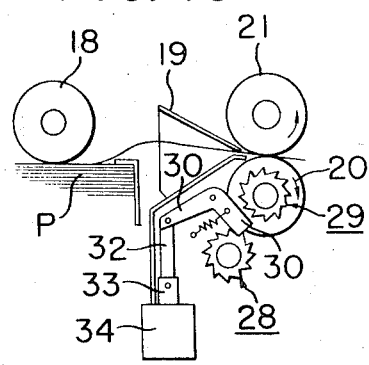

The operation of the paper feed mechanism will now be described with reference to FIGS. 12 and 13. In FIG. 12, the lever 30 of FIG. 10 is shown in engagement with the ratchet of the second clutch 29. In this position, the second clutch 29 is in clutched or "OFF" condition where the transmission of the rotation from the gear 27 to the roller shaft 26 is cut off. On the other hand, the shaft 24 of the first clutch 28 which is then in no engagement with the lever 30 is allowed to rotate and this rotation is transmitted through a wheel 35 mounted on the same shaft 24 and through a ladder chain 36 to a wheel 38 on the shaft 37 of the paper feed roller 18, which is thus rotated. The rotation of the paper feed roller 18 causes a paper sheet P to be fed in the manner described above, and when the fed paper sheet P has reached its proper position, the lever 30 changes over to engage the first clutch 28 to thereby allow the rotation of the transport rollers 20 and 21, whereupon the feed roller 18 is stopped from rotating. In this way, transmission of the drive from the constantly rotating prime mover shaft 22 can be very simply controlled by the swinging action of the lever 30 provided between the first and second clutches 28 and 29.

The present invention as embodied in a spring clutch and in a paper feed mechanism incorporating such clutch has various advantages as described hereunder. As has been noted above, the spring clutch of the present invention controls the intermittent transmission of the drive by utilizing the tightening and loosening actions of the coiled spring, and this leads to an economy of the space occupied and accordingly to a compactness of the entire mechanism. Moreover, the control means is provided by the coiled spring which eliminates the use of any complicated control means such as electromagnet and the like and this is highly meritorious in reducing the cost of the manufacture and troubles in operation. Furthermore, the coiled spring employed according to the present invention solves the problem of great mechanical shocks experienced in the conventional clutches during their intermittent operations because the spring of such type only simply repeats its tightening and loosening actions for clutching and declutching.

I claim:

1. A paper feeding device comprising, in combination, a support for placing thereon a paper, a paper feeding roller disposed above said support, a driving shaft, a first main rotary member having the same rotating center as that of said paper feeding roller and driven by said driving shaft, a first coil spring wound around said first main rotary member and the rotating portion of the shaft of said paper feeding roller, a first shift ring provided on the peripheral surface of said first coil spring with one end of said first coil spring being fixed thereto, a transport roller disposed in the front side of the paper advancement of said support, a second main rotary member having the same rotating center as that of said transport roller and driven by said driving shaft, a second coil spring wound around said second main rotary member and the rotating portion of the shaft of said transport roller, a second shift ring provided on the peripheral surface of said second coil spring with one end of said second coil spring being fixed thereto, and an engaging member for releasing the tightening by alternately engaging with said first and second shift rings.

2. A paper feeding device according to claim 1, wherein each of said shift rings comprises a ratchet formed integrally on the outer side wall, and wherein said engaging member is a shift pawl for alternately retaining said ratchets.

3. A paper feeding device according to claim 1, wherein each of said shift rings comprises a first frictional member formed integrally on the outer side wall, a second frictional member adopted for frictional engagement with said first frictional member.

4. A paper feeding device according to claim 2, wherein said ratchet formed on said shift ring comprises teeth each having a sloped surface on the forward side thereof, as viewed in the direction of rotation of such shift ring, and said shift pawl has a sloped surface complementary to said sloped surfaces of said ratchet teeth.

5. A paper feeding device according to claim 2, wherein said ratchet comprises teeth spaced at a substantial distance one from the next adjacent one.

* * * * *